3,211,557
PROCESS FOR FORTIFYING THE FLAVOR OF PRUNE JUICE

Fredoon S. Nury, Richmond, and Glenn G. Watters, Sebastopol, Calif., assignors to the United States of America as represented by the Secretary of Agriculture
No Drawing. Filed Oct. 16, 1962, Ser. No. 231,045
2 Claims. (Cl. 99—105)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the preparation of food products derived from prunes. A particular object of the invention is the provision of methods for improving the flavor of prune products. Further objects of the invention will be evident from the following description wherein parts and percentages are by weight unless otherwise specified.

A well-known article of commerce is the so-called prune juice which is made by extracting dried prunes with water. Although this product is a tasty and wholesome beverage, it is dark in color and has a rather muddy appearance. For this reason food processors in recent years have sought to put out juice products of a more attractive color and appearance. To this end, the product designated as fresh prune juice has been placed on the market. This product is made by blanching fresh prunes, mashing the blanched fruit, removing the pits, treating the macerate (pulp) with a pectinolytic enzyme, pressing the mass in a bag press to separate the juice from the skins and other fibrous material, filtering the juice, and finally pasteurizing and bottling the juice. Although fresh prune juice is more attractive than regular prune juice from an appearance standpoint, being a clear red liquid, it is lacking in true prune flavor. Thus although it is sweet, it lacks the fruity aroma of the product prepared from dried prunes.

In an investigation of this situation, we have conducted vapor phase chromatographic tests on conventional prune juice, fresh prune juice, and on the whole fruit and the several parts thereof. We have found that the fresh prune juice is lacking in a flavor peak which is characteristic of the prune pits. This flavor peak is, however, present in regular prune juice which accounts for the satisfactory flavor of this product. This finding of the significance of a flavor element in prune pits is utilized, in accordance with the invention, to fortify the flavor of prune products—typically fresh prune juice.

Basically, the process of the invention involves adding the flavor principles of prune pits to prune products which are deficient in flavor. In a preferred modification of the invention, this is achieved by adding prune pit extract to prune products which are deficient in flavor. The proportion of prune pit extract to be added in any particular case will depend on such factors as the flavor of the product to be fortified, the concentration of flavoring substances in the pit extract, and the flavor desired in the final product. In any specific situation, pilot trials are made, using different proportions of pit extract and selecting for the main batch the proportion which provides a product which has a desired level of fruity aroma.

The prune pit extract can be prepared in various ways. A convenient and preferred procedure involves grinding prune pits and extracting them with hot or cold water. After separation of the undissolved woody material, for example, by centrifuging, the aqueous liquid is ready for direct use in flavor-fortification of prune products. The prune pit extract can also be prepared by conventional distillation techniques. As an example, the prune pits are ground, put in water and the mixture subjected to distillation, the overhead being condensed and cooled in conventional manner. Another plan for preparing the pit extract involves the use of solvent extraction. To this end the ground pits are extracted with a low-boiling solvent such as tetrafluoromethane, trifluoromethane, trifluoromonochloromethane, hexafluoroethane, trifluoromonobromomethane, difluoromonochloromethane, pentafluoromonochloroethane, difluorodichloromethane, 1,1-difluoroethane, symmetrical tetrafluorodichloroethane, monofluorodichloromethane, octafluorocyclobutane, or the like. The resulting extract, after removal of undissolved material, is subjected to evaporation to remove the solvent and the residual material—the pit extract—containing the flavoring principles is used for flavor-fortifying prune products.

In another modification of the invention, the flavor fortification is achieved by using prune pits directly rather than in the form of an extract. One method of utilizing this novel principle involves contacting edible prune material such as pulp or juice with crushed prune pits. For example, in preparing fresh prune juice the fruit material is crushed in such type of equipment, for example, a hammermill, that not only is the flesh macerated but also the pits are cracked and disintegrated. By contact of the pulpy fruit material with the disintegrated pits, flavor principles derived from the latter are transferred to the pulpy material. It is to be emphasized that in this technique of the invention, the pits are deliberately crushed with the meaty part of the fruit. This is a complete departure from conventional practice wherein the fruit is mashed in a device such as a paddle finisher which results only in a pulping of the meaty part of the fruit while leaving the pits whole and intact. Under such conditions there occurs no flavor fortification of the fruit material; the flavor principles in the pits are locked in the woody pits and cannot be transferred to the pulp or juice. It is further obvious that in applying the instant phase of the invention, the pits used for flavor fortification of the prune material need not be derived from the same fruit but can be recovered, for example, from plants which de-pit dried prunes. Such recovered pits may be crushed and contacted with the prune pulp or juice for flavor fortification thereof. It is further obvious that where the flavor of prune products such as flesh, pulp, or juice is fortified by contact of the material with crushed prune pits, the degree of flavor fortification will depend on such factors as the proportion of pits in contact with the fruit material and the time of such contact. It is evident that such factors as increasing the proportion of crushed pits and increasing the time of contact will enhance the degree of flavor fortification. In any particular case, these conditions may be adjusted in correlation with the original flavor of the prune material to produce a product which has a desired level of enhanced prune flavor.

The invention may be utilized to fortify the flavor of prune products of all kinds. As explained above, the invention is especially useful in improving the flavor of fresh prune juice. Other products to which the invention can be applied are dry prunes in whole, piece, chopped, or pulp form. The invention is of particular usefulness where these products have the pits removed so that they are deficient in natural flavor. Typical among such products are pitted dry prunes and the products made therefrom, such as diced, sliced chopped, ground, or mashed products. By incorporating the flavor principles of prune pits into such materials, final products of superior flavor are readily attained.

The invention is further demonstrated by the following illustrative examples:

*Example I*

(a) A batch of fresh prune juice was prepared in conventional manner. To this end, fresh prunes were heated to 212° F. and the blanched fruit passed through a paddle finisher to macerate the prune flesh and to separate the pits from the mashed fruit flesh. The macerate was allowed to remain for 12 hours with added pectinolytic enzyme (0.25%). Then, the mass was pressed through a filter cloth to separate the skins and other fibrous material. The resulting juice was pasteurized and bottled while still hot.

(b) A batch of prune pit extract was prepared as follows: A quantity of pits removed from dried prunes was ground. To one part of the ground pits was added two parts of cold water and the mixture allowed to stand for about two hours. The mixture was then centrifuged, the supernatant liquid constituting the pit extract.

(c) The fresh prune juice and pit extract (prepared as described above in parts (a) and (b), respectively) were mixed in various proportions, as indicated below, to provide three samples of flavor-fortified juice.

| Sample | Proportion of fresh juice, percent (vol. basis) | Proportion of pit extract, percent (vol. basis) |
|---|---|---|
| 1 | 90 | 10 |
| 2 | 95 | 5 |
| 3 | 97.5 | 2.5 |

(d) The flavor-fortified juices prepared as above described were submitted to a panel of skilled tasters for evaluation. In each case the flavor-fortified product was compared with fresh juice which had been diluted with water to the same level. The judges were provided with unmarked samples of which they were required to select the flavor-fortified and untreated juice and to rate them for flavor. The results are tabulated below:

| Sample | Pit extract content, percent (vol. basis) | Correct identification of flavor-fortified product and fresh juice, percent (of judges) | Preference for flavor-fortified product, percent (of judges) |
|---|---|---|---|
| 1 | 10 | 93 | 89 |
| 2 | 5 | 100 | 96 |
| 3 | 2.5 | 81 | 90 |

*Example II*

Fresh prunes were heated in steam until their temperature was about 212° F. The blanched fruit was then ground in a hammermill so that not only the flesh but also the pits were crushed and disintegrated. The resulting macerate was allowed to stand 12 hours with added pectinolytic enzyme (0.25%). Then, the mass was pressed through a filter cloth to separate the crushed pits, skins, and other fibrous material. The resulting juice was pasteurized and bottled while still hot. The resulting product was subjected to taste tests. It was found that it had more prune flavor than did the conventional fresh juice prepared as described in Example I, part (a), from the same fruit.

Having thus described the invention, what is claimed is:

1. A method for preparing prune juice of improved flavor which comprises producing a juice from fresh prunes, grinding prune pits, extracting the ground prune pits with water to prepare a pit extract containing prune flavor components, and admixing a major proportion of said juice with a minor proportion of said pit extract.

2. A method for preparing prune juice of improved flavor which comprises producing a juice from fresh prunes, grinding dried prune pits, extracting the ground dried prune pits with water to prepare a pit extract containing prune flavor components, and admixing a major proportion of said juice with a minor proportion of said pit extract.

References Cited by the Examiner

"Cassell's Dictionary of Cookery," Cassell, Petter, Galpin & Co., London, 1877, pp. 659 to 660.

Cruess, "Commercial Fruit and Vegetable Products," 2nd ed., New York, 1938, pp. 586 to 591.

Tressler et al., "Fruit and Vegetable Juices," New York, 1939, pp. 288 to 293.

A. LOUIS MONACELL, *Primary Examiner.*